(12) United States Patent
Kim

(10) Patent No.: US 6,209,117 B1
(45) Date of Patent: Mar. 27, 2001

(54) METHOD FOR CANCELING ABNORMAL SYNCHRONIZATION SIGNAL

(75) Inventor: Byeong-soo Kim, Kwachun (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/145,302

(22) Filed: Sep. 2, 1998

(30) Foreign Application Priority Data

Nov. 21, 1997 (KR) .................................................. 97-62050

(51) Int. Cl.⁷ .............................. H03M 13/03; H04L 7/00
(52) U.S. Cl. ........................ 714/789; 360/51; 375/357; 375/360
(58) Field of Search ................ 714/789; 369/33, 369/47, 59, 49; 360/40, 51, 59; 386/125, 124; 375/354, 357, 362, 360, 375

(56) References Cited

U.S. PATENT DOCUMENTS

| | | | |
|---|---|---|---|
| Re. 33,665 | * 8/1991 | Ogawa | 369/33 |
| 4,908,812 | * 3/1990 | Aoshima et al. | 386/125 |
| 4,979,192 | * 12/1990 | Shimizume et al. | 375/362 |
| 5,414,473 | * 5/1995 | Hong | 348/625 |
| 5,446,715 | * 8/1995 | Satomura | 369/49 |

FOREIGN PATENT DOCUMENTS

| | | | |
|---|---|---|---|
| 57-111810 | 7/1982 | (JP) | G11B/5/09 |
| 58-94254 | 6/1983 | (JP) | H04L/7/04 |
| 60-137150 | 7/1985 | (JP) | H04L/7/08 |
| 1-268330 | 10/1989 | (JP) | H04L/7/00 |
| 2-306472 | 12/1990 | (JP) | G11B/20/10 |
| 4-348631 | 12/1992 | (JP) | H04L/7/08 |
| 5-159474 | 6/1993 | (JP) | G11B/20/12 |
| 6-334644 | 12/1994 | (JP) | H04L/7/08 |
| 8-149118 | 6/1996 | (JP) | H04L/7/00 |

\* cited by examiner

Primary Examiner—Emmanuel L. Moise
(74) Attorney, Agent, or Firm—Sughrue, Mion, Zinn, Macpeak & Seas, PLLC

(57) ABSTRACT

A method of canceling an abnormal synchronous signal including the steps of: detecting a predetermined pattern data synchronous signal from input digital data; determining that a detected synchronous signal is an actual synchronous signal if the detected synchronous signal has periodicity; and, otherwise, annulling the detected synchronous signal. In the above-described method, normally-recorded actual synchronous signals are detected while abnormal synchronous signals are canceled from the detected synchronous signals, on the basis of the periodicity of the synchronous signals and identification information. Thus, normal signal processing can be performed using the detected actual synchronous signal.

18 Claims, 5 Drawing Sheets

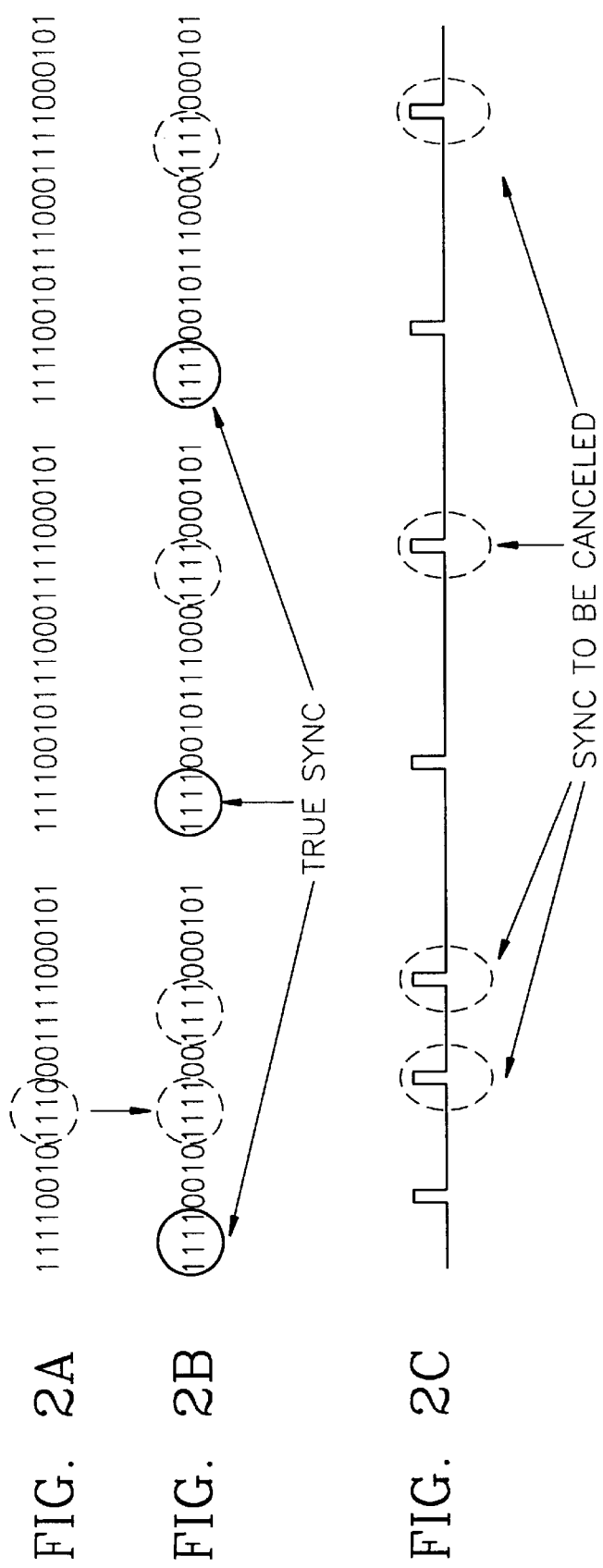

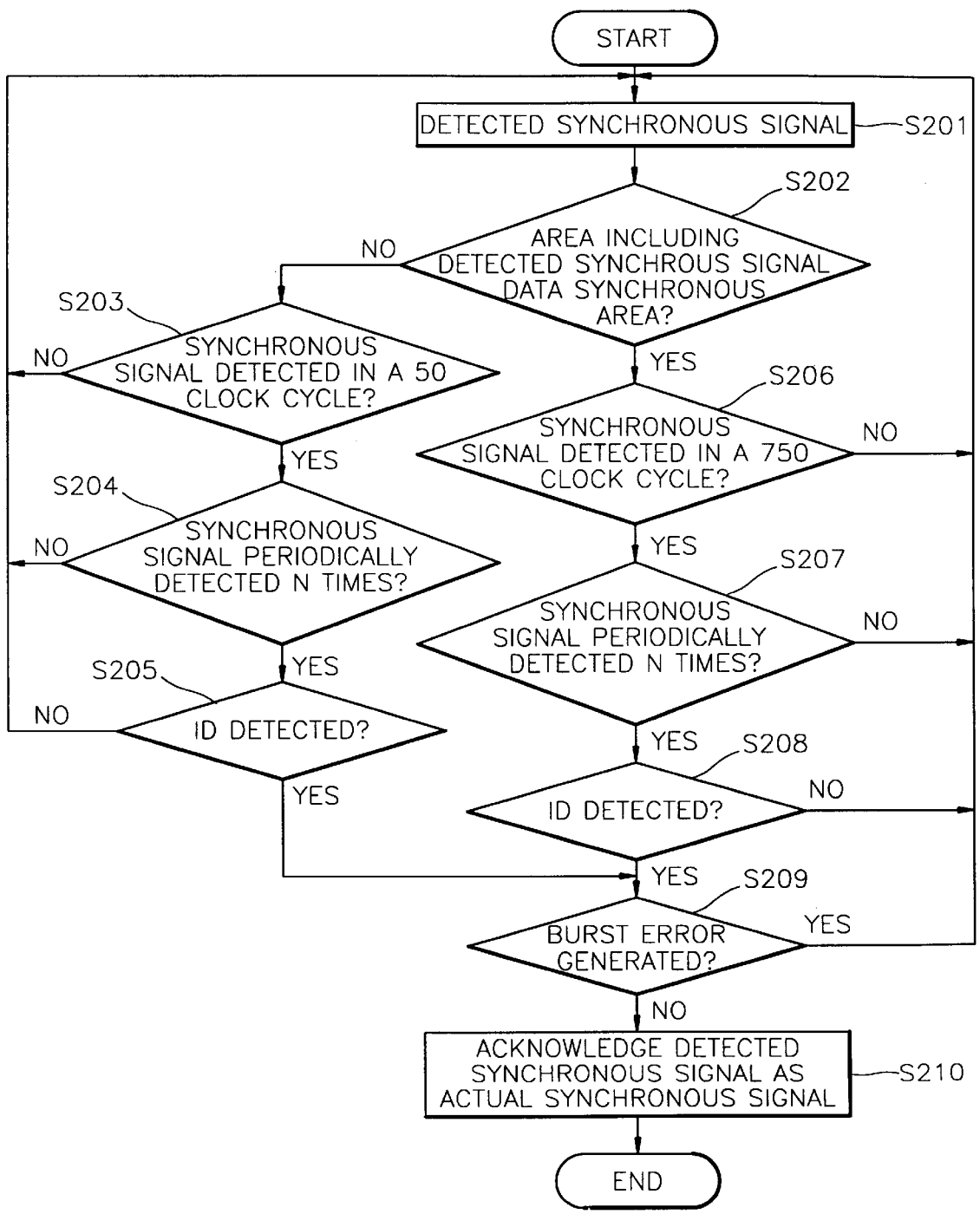

METHOD FOR CANCELING ABNORMAL SYNCHRONIZATION SIGNAL

The following disclosure is based on Korean Patent Application No. 97-62050, filed on Nov. 21, 1997, which is incorporated into this application by reference.

BACKGROUND OF THE INVENTION

1. Field of the Invention

The present invention relates to synchronous signal detection, and more particularly, to a method for canceling an abnormal synchronous signal using the periodicity of a synchronization signal.

2. Description of the Related Art

Signal processing and recording/reproduction (or transmission/reception) are now generally done digitally for multimedia applications. In this digital recording/reproduction, a signal is recorded on a recording medium in units of a synchronization block in order to successfully restore the original recorded signal upon reproduction. Also, a synchronization signal of a predetermined pattern is periodically recorded on the recording medium, and detected upon reproduction, to be used as a reference signal for signal processing.

Upon the detection of the synchronization signal, abnormal synchronous signals other than a desired synchronization signal may possibly be generated according to the state and conditions of a channel, or a synchronization signal may be damaged. Thus, appropriate processing is required. In particular, abnormal synchronization signals are frequently detected in addition to the normal recorded synchronization signals. These mis-detected synchronization signals prevent the restoration of the original signal.

SUMMARY OF THE INVENTION

To solve the above problem, it is an objective of the present invention to provide a method for canceling an abnormal synchronization signal, for a digital recording/reproduction apparatus or a digital transmission/reception apparatus in order to detect only normal synchronization signals and remove abnormal synchronization signals other than the normal synchronization signals.

Another objective of the present invention is to provide a method for canceling abnormal synchronization signals, for a digital recording/reproduction apparatus having a standard definition (SD) format, in order to detect only normal synchronization signals and remove abnormal synchronization signals other than the normal synchronization signals.

Accordingly, to achieve the first objective, there is provided a method of canceling an abnormal synchronous signal, comprising the steps of: detecting a predetermined pattern data synchronous signal from input digital data, and deciding that a detected synchronous signal is an actual synchronous signal if the detected synchronous signal has periodicity, and otherwise, annulling the detected synchronous signal.

To achieve the second objective, there is provided a method of canceling an abnormal synchronous signal in a method of recording digital data in divided pre-synchronous blocks and data synchronous blocks and reproducing the recorded digital data, comprising the steps of: detecting a predetermined pattern data synchronous signal from the recorded digital data, deciding that a detected synchronous signal is an actual synchronous signal if the detected synchronous signal has a first period, and, otherwise, annulling the detected synchronous signal.

BRIEF DESCRIPTION OF THE DRAWINGS

The above objectives and advantage of the present invention will become more apparent by describing in detail a preferred embodiment thereof with reference to the attached drawings in which:

FIGS. 2A–2C illustrate an example of abnormal synchronization signal detection occurring in reproduced data, caused by channel error;

FIG. 4 is a flowchart illustrating a method of canceling an abnormal synchronization signal, according to another embodiment of the present invention.

DESCRIPTION OF THE PREFERRED EMBODIMENTS

A digital recording/reproduction apparatus (or a digital transmission/reception apparatus) typically records information serially, i.e., in bit units, and reproduces this recorded information as parallel data, i.e., in byte units as information words. Here, a synchronization signal is necessary as a reference signal.

That is, upon recording, a synchronization signal is recorded at constant intervals. Upon reproduction, serial-to-parallel (S/P) conversion is performed according to the recorded synchronization signal. This synchronization signal is used as the reference signal for several signal processing steps after being converted into parallel. Thus, the synchronization signal sets a predetermined pattern and is periodically recorded at predetermined positions. However, upon reproduction, not only the synchronization signals recorded at the prezdetermined positions are reproduced, but abnormal synchronization signals are additionally generated by various phenomena, such as channel error. In the present invention, it is determined which synchronization signals among detected synchronization signals are normally-recorded actual synchronization signals. Also, abnormal synchronization signals are removed, so that normal signal processing can be performed using only the actual synchronization signals.

Figure 1A:
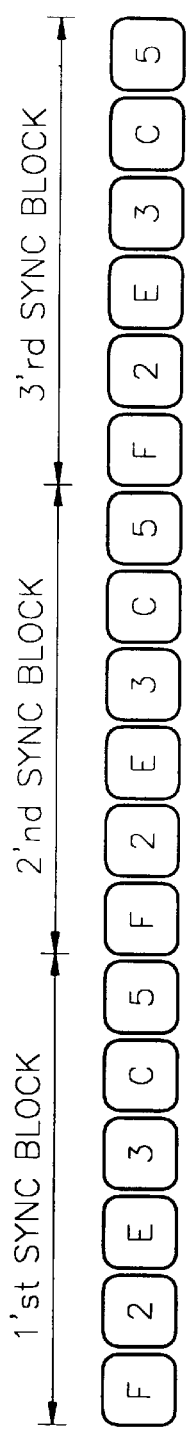
FIGS. 1A–1C illustrate an example of abnormal synchronization signal detection occurring in data recorded after parallel-to-serial conversion.
Figure 1B:
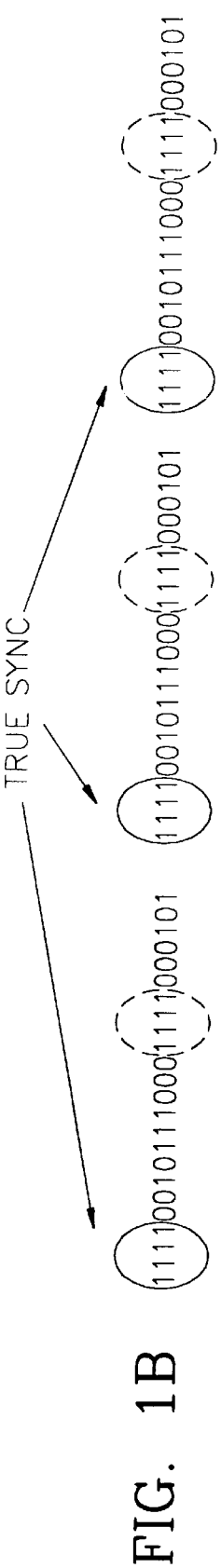
Figure 1C:
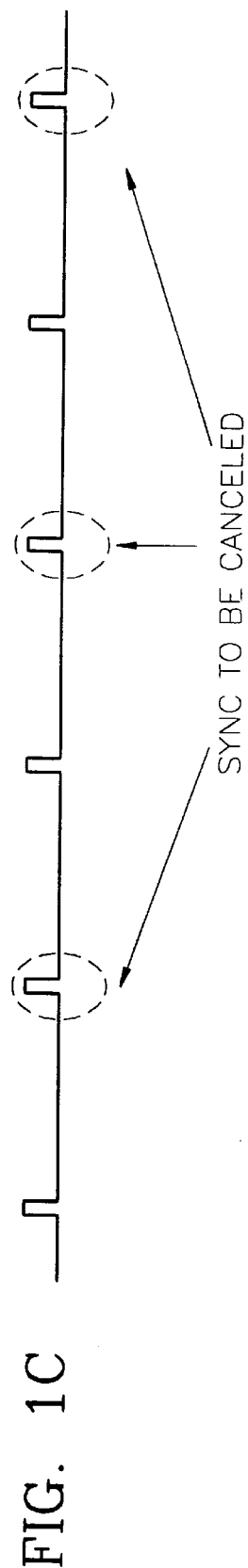

FIGS. 1A–1C illustrate an abnormal synchronization signal generated in digital data recorded after parallel-to-serial conversion. If one synchronization block has values F, 2, E, 3, C and 5 (hexadecimal), where F is a synchronization pattern, and data is of 4 bits, FIG. 1A denotes three consecutive synchronization blocks to be recorded. Synchronization block data as shown in FIG. 1A is recorded on a recording medium after undergoing the parallel-to-serial conversion, as shown in FIG. 1B. When a synchronization pattern F is searched for from the data recorded on the recording medium, an abnormal synchronization signal pattern that is the same as a synchronization signal pattern, and that is shown in FIG. 1B circled by a dotted line, on a bitstream can be generated in addition to the properly recorded, actual synchronization signal. Accordingly, as shown in FIG. 1C, abnormal synchronization signal flags, shown circled by dotted lines, must be removed from the detected synchronization signals upon reproduction.

FIGS. 2A–2C illustrate an abnormal synchronization signal generated in reproduced data due to a channel error, wherein an error is generated in a bitstream on a recording medium, and data similar to a synchronization pattern are reproduced as an abnormal synchronization signal.

That is, an actual bitstream recorded on a recording medium is E (1110) as shown in FIG. 2A, and a reproduced bitstream is reproduced as F (1111) due to a channel error as shown in FIG. 2B, and can be detected as an abnormal synchronous signal as shown in FIG. 2C. In this case as well, the abnormal synchronization signal flags, shown circled by dotted lines, must be removed from the detected synchronization signals.

The abnormal synchronization signal can be generated by P/S conversion as shown in FIG. 1 or by channel error as shown in FIG. 2. However, the abnormal synchronization signal also can be generated by several other phenomena, and the present invention is not limited in this respect.

Figure 3:
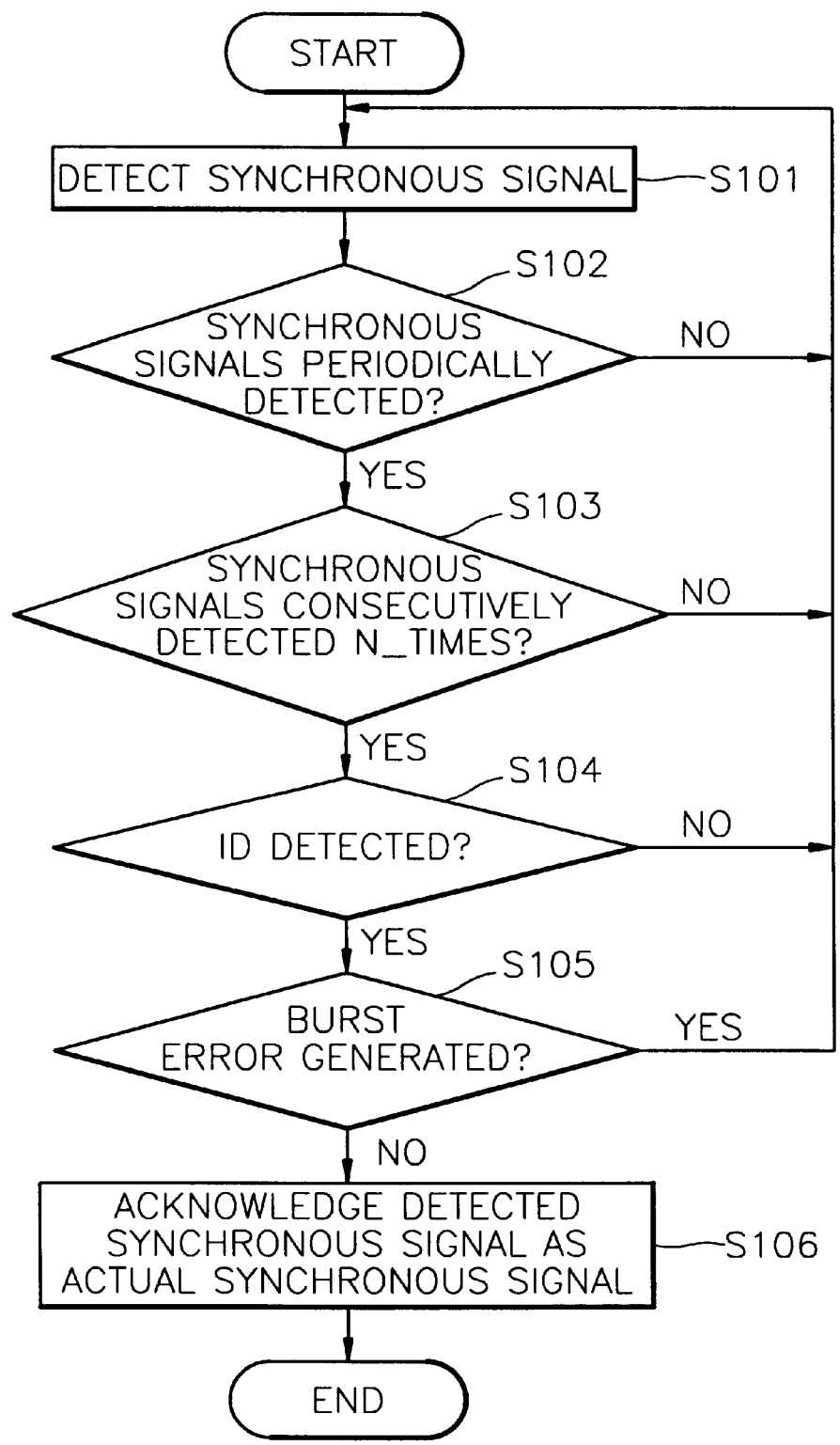
FIG. 3 is a flowchart illustrating a method of canceling an abnormal synchronization signal, according to a first embodiment of the present invention.

FIG. 3 is a flowchart illustrating a method of canceling an abnormal synchronization signal, according to a first embodiment of the present invention, which can be used in a typical digital recording/reproducing apparatus or digital transmission/reception apparatus.

Referring to FIG. 3, a synchronization signal is detected using input reproduction data and a reproduction clock signal, in step S101. A determination of whether the synchronous signal is detected periodically is made, in step S102. If it is determined in step S102 that the detected synchronization signal is not periodic with respect to preceding signals, the procedure returns to step S101 to again detect a synchronous signal.

If it is determined in step S102 that the detected synchronization signal is periodic, a determination of the number of times the detected synchronization signal has periodically occurred is made, in step S103. If the synchronization signal has not been detected successively N times (N is an integer that is equal to or greater than 1) in step S103, the procedure returns to step S101 to again detect a synchronization signal. If the synchronization signal has been periodically detected N times in step S103, it is determined whether identification (ID) information following the synchronization signal is detected.

Here, when the conditions of steps S101, 102 and S103 are all satisfied, i.e., the synchronization signal is periodically detected N times or more, the detected synchronization signal is confirmed as an actual synchronous signal. Then, the ID information is detected in step S104 to increase the reliability of the synchronous detection. Alternatively, when the ID value is satisfied, the detected synchronous signal can be determined as the actual synchronous signal. The time of this determination can be set according to system characteristics. After the actual synchronization signal is detected via steps S101 through S104 in this way, the abnormal synchronization signals generated by the phenomena shown in FIGS. 1 and 2 can be canceled.

However, the digital recording/reproducing apparatus often produces burst errors, where errors are successively generated, in addition to random errors. Synchronization patterns that are the same as synchronization signals can be consecutively generated by the burst error. A determination of whether the detected synchronization signal is caused by the burst error is made using a window generated at a predetermined position where the actual synchronous signal is generated, in order to take into account the possibility of burst error, in step S105. If the detected synchronization signal is generated by the burst error in step S105, the procedure returns to step S101 to annul the detected synchronous signal and again detect a synchronous signal. If no burst error is generated in step S105, the detected synchronous signal is acknowledged as the actual synchronous signal, and appropriate subsequent processes are performed using the actual synchronous signal, in step S106.

FIG. 4 is a flowchart illustrating a method of canceling an abnormal synchronization signal, according to a second embodiment of the present invention, which can be applied to a standard definition-digital video camcorder (SD-DVC). Referring to FIG. 4, synchronization signals are detected according to input reproduction data and a reproduction clock signal, in step S201. Here, the structure of synchronization signals in the SD-DVC will be described referring to FIG. 5.

Figures 5A, 5B, 5C, 5D:
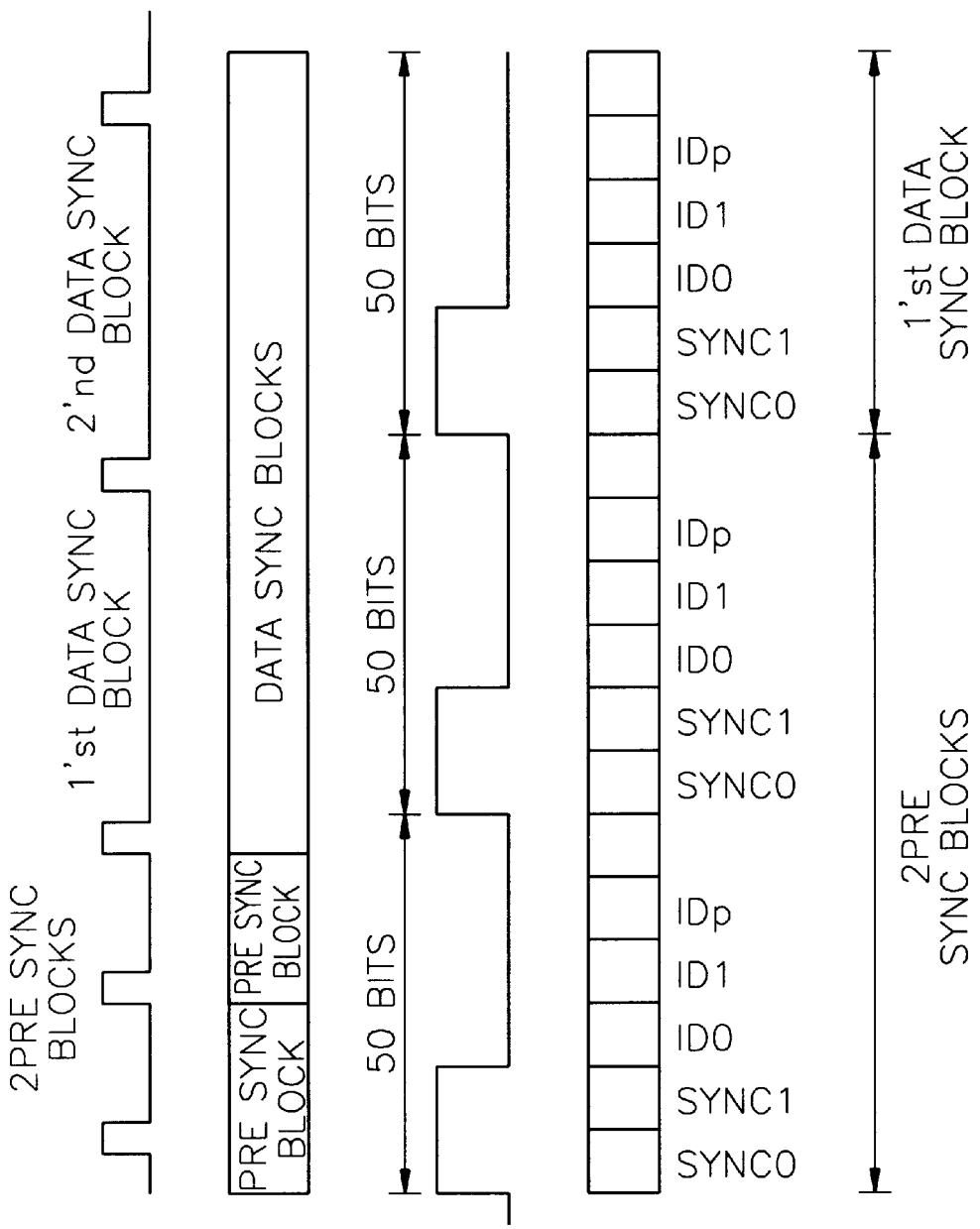
FIGS. 5A–5D are a format diagram illustrating recording and reproduction of a digital tape for SD-DVC adopting the method shown in FIG. 4.

FIGS. 5A–5D show the recording and reproduction format of data recorded on a tape of the SD-DVC, and show, in particular, an audio or video sector. FIG. 5A shows synchronization signal flags indicating the position of a synchronization signal. These synchronization signal flags denote two synchronization signal flags with respect to two pre-synchronous blocks of a 50 clock cycle period and several synchronization signal flags with respect to several (149 video sectors and 15 audio sectors) data synchronous blocks of a 750 clock cycle period. FIG. 5B shows recorded data (reproduced data) recorded in the two pre-synchronous blocks and several data synchronous blocks.

FIGS. 5C and 5D are magnified views of parts of the synchronization signal flag and the recorded data (reproduced data) shown in FIGS. 5A and 5B. As shown in FIG. 5C, the video sector (audio sector) has two pre-synchronous blocks of 50 bits. Since several data synchronous blocks of 750 bits exist, three synchronization signals are consecutively recorded at intervals of 50 clock cycles, and a synchronization signal is then recorded at intervals of 750 clock cycles.

As shown in FIG. 5D, data following synchronous signals SYNCO and SYNCI is an ID code which comprises ID data ID0 and ID1 of two bytes and an ID parity (IDp) of one byte. Here, the second ID data ID1 includes a synchronous block number, and the values of the synchronous block numbers are sequentially increased from the first synchronous signal. The data is entirely comprised of a binary coded hollerith (BCH) error correction code (ECC) code, so a determination of whether the detected synchronous signal is an actual synchronous signal is made by checking the continuity of these synchronous block numbers during reproduction. The first data synchronous block shown in FIG. 5D is of 750 bits, but FIG. 5D shows only 50 bits including a data synchronous signal.

Meanwhile, when a synchronous signal having a predetermined pattern is detected from a bit stream recorded by the tape format, it is determined whether an area having the detected synchronous signal is an area of a pre-sync block or an area of a pure data synch block, in step S202. That is, if the detected synchronous signal has a 750 clock cycle, it is determined whether the area having the detected synchronous signal is the area of the data sync block, in step S202.

If the area having the detected synchronous signal is not the area of the data sync block in step S202, it is determined whether the detected synchronous signal has a 50 clock cycle, in step S203. If the detected synchronous signal does not have the 50 clock cycle, the procedure returns to step S201 to again detect a synchronous signal. If the detected synchronous signal has the 50 clock cycle in step S203, it is determined whether the synchronous signal is periodically detected N times, in step S204. If the detected synchronous signal does not have periodicity, the procedure returns to step S201 to again detect a synchronous signal. If the detected synchronous signal has periodicity in step S204, the ID is detected after the synchronous signal. A determination of whether the detected ID value has continuity is made in step S205. If the ID value has no continuity, the procedure returns to step S201 to again detect a synchronous signal.

In steps S203 through S205, an actual synchronous signal is detected using the fact that two pre-synchronous signals and the first data synchronous signal are recorded and reproduced at intervals of 50 clock cycles three consecutive times. Also, in the present invention, if the two pre-synchronous signals are detected but the first data synchronous signal is not detected, the continuity of an ID value is detected to determine whether the detected synchronous signal is an actual synchronous signal.

Meanwhile, if the area where a current synchronous signal is detected is an area of a data synchronous block in step S202, it is determined whether a detected synchronous signal is a synchronous signal having a 750 clock cycle, in step S206. If the detected synchronous signal does not have a 750 clock cycle, the procedure returns to step S201 to again detect a synchronous signal. On the other hand, if the signal is detected in a 750 clock cycle, it is determined whether the synchronous signal is periodically detected N times in the 750 clock cycle, in step S207. If the detected synchronous signal does not have periodicity, the procedure returns to step S201 to again detect a synchronous signal. If the detected synchronous signal has periodicity in step S207, the ID is detected after the synchronous signal. A determination of whether the detected ID value has continuity is made in step S208. If the ID value has no continuity, the procedure returns to step S201 to again detect a synchronous signal.

Here, as shown in FIG. 5, the pre-synchronous signal is placed at the beginning of an audio/video sector. Thus, after the pre-synchronous signal is detected twice, a pre-synchronous signal is not detected until a new track starts. Accordingly, when an actual synchronous signal is not detected since an error is generated in the pre-synchronous signal, even though the steps S203 through S205 are performed, in addition, steps S206 through S208 are provided. The performance of steps S206 through S208 indicates that the pre-synchronous block has already passed and that data synchronous blocks are appearing. Since the cycle of the data synchronous signal is 750 clock cycles in these steps, an actual synchronous signal is detected by determining whether the data synchronous signal is detected while satisfying this condition.

Meanwhile, after step S205 or S208, a determination of whether the synchronous signal is detected due to a burst error is made using the window generated at a predetermined position where the actual synchronous signal is generated, in step S209. If the burst error is generated, the procedure returns to step S201 to annul the detected synchronous signal and detect another synchronous signal. If the burst error is not generated in step S209, the detected synchronous signal is acknowledged as the actual synchronous signal, and appropriate subsequent processes are performed using the actual synchronous signal, in step S210.

In FIG. 4, a method of checking if the detected synchronous signal is the actual synchronous signal is roughly divided into two inquiries. In the first inquiry, steps S203 through S205 are performed to check if a pre-synchronous signal of a 50 clock cycle period is detected. In the second inquiry, when it is impossible to check if the detected pre-synchronous signal is an actual synchronous signal since an error was generated in the pre-synchronous block, steps S206 through S208 are performed to detect an actual data synchronous signal within the data synchronous block, depending on whether a data synchronous signal of a 750 clock cycle period is detected.

The present invention can be effectively applied to digital recording/reproducing apparatuses or digital transmission/reception apparatuses, and is suitable particularly for digital recording/reproducing apparatuses, such as a digital camcorder, a digital VCR, or DVD family products (e.g., a DVD ROM drive, a DVD player, a DVD RAM, etc.), which have been developed and produced lately, as full digital processing of video and audio signals has become more common.

According to the present invention, abnormal synchronous signals are canceled, and only normally-recorded actual synchronous signals are detected as such, using the periodicity of the synchronous signal among many similar synchronous signals detected upon reproduction (reception). Thus, normal signal processing can be performed using the detected actual synchronous signal.

What is claimed is:

1. A method of canceling an abnormal synchronous signal, comprising the steps of:
   (a) detecting a predetermined pattern data synchronous signal from input digital data;
   (b) determining that a detected synchronous signal is an actual synchronous signal if the detected synchronous signal has periodicity; and
   (c) annulling the detected synchronous signal if the detected synchronous signal does not have periodicity.

2. The method of canceling an abnormal synchronous signal as claimed in claim 1, further comprising the steps of:
   (d) using a window generated at a position of a predetermined synchronous signal to further determine whether the detected synchronous signal is generated by a burst error;
   (e) determining that the detected synchronous signal is an actual synchronous signal if the detected synchronous signal is not generated by a burst error; and
   (f) annulling the detected synchronous signal if the detected synchronous signal is generated by a burst error.

3. The method of canceling an abnormal synchronous signal as claimed in claim 1, wherein, in said step (b), the detected synchronous signal is determined to be an actual synchronous signal if the detected synchronous signal is periodically detected at least N times, where N is an integer at least equal to 1.

4. A method of canceling an abnormal synchronous signal, comprising the steps of:
   (a) detecting a predetermined pattern data synchronous signal from input digital data;
   (b) determining whether a detected synchronous signal has periodicity;
   (c) when the detected synchronous signal has periodicity, determining that the detected synchronous signal is an actual synchronous signal if identification information is detected; and
   (d) annulling the detected synchronous signal if identification information is not detected.

5. The method of canceling an abnormal synchronous signal as claimed in claim 4, further comprising the steps of:
   (e) using a window generated at a position of a predetermined synchronous signal to further determine whether the detected synchronous signal is generated by a burst error;
   (f) determining that the detected synchronous signal is an actual synchronous signal if the detected synchronous signal is not generated by a burst error; and (g) annulling the detected synchronous signal if the detected synchronous signal is generated by a burst error.

6. The method of canceling an abnormal synchronous signal as claimed in claim 4, wherein, in said step (b), the detected synchronous signal is determined to be an actual synchronous signal if the detected synchronous signal is periodically detected at least N times, where N is an integer at least equal to 1.

7. A method of canceling an abnormal synchronous signal in a method of recording digital data in divided pre-synchronous blocks and data synchronous blocks and reproducing the recorded digital data, comprising the steps of:

(a) detecting a predetermined pattern data synchronous signal from the recorded digital data;

(b) determining that a detected synchronous signal is an actual synchronous signal if the detected synchronous signal has a first period;

(c) determining that the detected synchronous signal is an actual synchronous signal if the detected synchronous signal is a data synchronous signal for a data synchronous block having a second period different from said first period; and (d) annulling the detected synchronous signal if the detected synchronous signal is not an actual synchronous signal as determined in the steps (b) and (c).

8. The method of canceling an abnormal synchronous signal as claimed in claim 7, further comprising the steps of:

(e) using a window generated at a position of a predetermined synchronous signal to further determine whether the detected synchronous signal is generated by a burst error;

(f) determining that the detected synchronous signal is an actual synchronous signal if the detected synchronous signal is not generated by a burst error; and (g) annulling the detected synchronous signal if the detected synchronous signal is generated by a burst error.

9. The method of canceling an abnormal synchronous signal as claimed in claim 7, wherein, in said step (b), the detected synchronous signal is determined to be an actual synchronous signal if pre-synchronous signals for the pre-synchronous blocks are periodically detected with the first period and a first data synchronous signal is then detected with the first period.

10. The method of canceling an abnormal synchronous signal as claimed in claim 7, wherein, in said step (d), the detected synchronous signal is determined to be an actual synchronous signal if the data synchronous signal is periodically detected N times with the second period, where N is an integer at least equal to 1.

11. A method of canceling an abnormal synchronous signal in a method of recording digital data in divided pre-synchronous blocks and data synchronous blocks and reproducing the recorded digital data, comprising the steps of:

(a) detecting a predetermined pattern data synchronous signal from the recorded digital data;

(b) determining whether a detected synchronous signal has a first period;

(c) when the detected synchronous signal has the first period, determining that the detected synchronous signal is an actual synchronous signal if identification information is detected after the detection of the synchronous signal; and (d) annulling the detected synchronous signal if the identification information is not detected.

12. The method of canceling an abnormal synchronous signal as claimed in claim 11, further comprising the steps of:

(e) when the detected synchronous signal does not have the first period, determining whether the detected synchronous signal is a data synchronous signal for a data synchronous block having a second period;

(f) when the detected synchronous signal is a data synchronous signal having the second period, determining that the detected synchronous signal is an actual synchronous signal if identification information is detected after the detection of the synchronous signal; and (g) annulling the detected synchronous signal if the identification information is not detected.

13. The method of canceling an abnormal synchronous signal as claimed in claim 12, wherein, in said step (e), the detected synchronous signal is determined to be an actual synchronous signal if the data synchronous signal is detected N times with the second period, where N is an integer at least equal to 1.

14. The method of canceling an abnormal synchronous signal as claimed in claim 12, wherein in step (f), the detected synchronous signal is determined to be an actual synchronous signal if the detected identification information has continuity with respect to a sequentially-increasing synchronous block number.

15. The method of canceling an abnormal synchronous signal as claimed in claim 11, further comprising the steps of:

(e) using a window generated at a position of a predetermined synchronous signal to further determine whether the detected synchronous signal is generated by a burst error;

(f) determining that the detected synchronous signal is an actual synchronous signal if the detected synchronous signal is not generated by a burst error; and (g) annulling the detected synchronous signal if the detected synchronous signal is generated by a burst error.

16. The method of canceling an abnormal synchronous signal as claimed in claim 11, wherein, in said step (c), the detected synchronous signal is determined to be an actual synchronous signal if the detected identification information has continuity with respect to a sequentially-increasing synchronous block number.

17. The method of canceling an abnormal synchronous signal as claimed in claim 11, wherein, in said step (c), the detected synchronous signal is determined to be an actual synchronous signal if pre-synchronous signals for the pre-synchronous blocks are periodically detected with the first period and a first data synchronous signal is then detected with the first period.

18. The method of canceling an abnormal synchronous signal as claimed in claim 11, wherein, in said step (b), if pre-synchronous signals for the pre-synchronous blocks are detected at least N times with the first period, where N is an integer at least equal to 1, the detected synchronous signal is determined to be an actual synchronous signal using the detected identification information, even though the first data synchronous signal is not detected.

* * * * *